(12) United States Patent
Oh (10) Patent No.: US 7,620,401 B2
(45) Date of Patent: Nov. 17, 2009

(54) WIRELESS COMMUNICATIONS SYSTEM, WIRELESS COMMUNICATIONS METHOD, WIRELESS COMMUNICATIONS PROGRAM AND PROGRAM RECORDING MEDIUM

(75) Inventor: Waho Oh, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 605 days.

(21) Appl. No.: 10/539,073

(22) PCT Filed: Dec. 3, 2003

(86) PCT No.: PCT/JP03/15504

§ 371 (c)(1),
(2), (4) Date: Jun. 15, 2005

(87) PCT Pub. No.: WO2004/062310

PCT Pub. Date: Jul. 22, 2004

(65) Prior Publication Data

US 2006/0135150 A1 Jun. 22, 2006

(30) Foreign Application Priority Data

Dec. 25, 2002 (JP) ............................. 2002-374453

(51) Int. Cl.
*H04W 36/00* (2006.01)
(52) U.S. Cl. ...................... 455/441; 455/425; 455/437; 455/442; 455/436; 455/443; 455/444
(58) Field of Classification Search ................. 455/425, 455/441, 437, 442, 436, 443, 444
See application file for complete search history.

(56) References Cited

U.S. PATENT DOCUMENTS 5,732,347 A * 3/1998 Bartle et al. ................. 455/421

(Continued)

FOREIGN PATENT DOCUMENTS

CN 1314064 A 9/2001

(Continued)

*Primary Examiner*—Patrick N. Edouard
*Assistant Examiner*—Justin Y Lee
(74) *Attorney, Agent, or Firm*—Birch, Stewart, Kolasch & Birch, LLP (57) ABSTRACT

A dual mode mobile terminal has a dual mode in which said mobile terminal can be connected to any of two different wireless communications systems (hereinafter referred to as systems 1 and 2). The mobile terminal can be connected to optimum wireless communications system by considering conditions at which the mobile terminal is (moving speed, communication data rate) even if it is in the state of communicating using any of systems 1 and 2. The mobile terminal (3) which can be connected to any of the system 1 having a wide service area and medium and low communication data rate and the system 2 having a local service area and high communication data rate determines whether or not it is in the service area of the systems 1 and 2. Based upon the moving speed and/or the communication data rate of the current mobile terminal (3), the mobile terminal (3) is connected to the system 1 or 2 if the moving speed is higher or lower than a predetermined threshold, respectively, and is connected to the system 2 or 1 if the communication data rate is higher or lower than a predetermined threshold, respectively, irrespective of whether the mobile terminal is in the communicating state or not. Prior to connection, selection of the wireless system is informed to the user and the connection may be made in accordance with an instruction from the user.

19 Claims, 5 Drawing Sheets

U.S. PATENT DOCUMENTS

| | | | |
|---|---|---|---|
| 6,256,500 B1 * | 7/2001 | Yamashita | 455/441 |
| 2002/0010915 A1 | 1/2002 | Maeda | |
| 2002/0105935 A1 | 8/2002 | Miya | |
| 2003/0064729 A1 * | 4/2003 | Yamashita | 455/451 |
| 2004/0102194 A1 * | 5/2004 | Naghian et al. | 455/436 |
| 2004/0203606 A1 * | 10/2004 | Souissi et al. | 455/412.1 |

FOREIGN PATENT DOCUMENTS

| | | |
|---|---|---|
| CN | 1381108 A | 11/2002 |
| JP | 8-275223 A | 10/1996 |
| JP | 9-130405 A | 5/1997 |
| JP | 9-200827 A | 7/1997 |
| JP | 11-205374 | 7/1999 |
| JP | 2000-32032 A | 1/2000 |
| JP | 2000-224640 A | 8/2000 |
| JP | 2001-346265 A | 12/2001 |
| JP | 2001-358765 | 12/2001 |
| JP | 2002-27522 A | 1/2002 |
| JP | 2002-190769 A | 7/2002 |
| JP | 2002-199426 A | 7/2002 |
| WO | WO-00/05912 A1 | 2/2000 |

* cited by examiner

WIRELESS COMMUNICATIONS SYSTEM, WIRELESS COMMUNICATIONS METHOD, WIRELESS COMMUNICATIONS PROGRAM AND PROGRAM RECORDING MEDIUM

TECHNICAL FIELD

The present invention relates to a wireless communications system, wireless communications method, wireless communications program and program recording medium. In particular, it relates to a wireless communications system, wireless communications method, wireless communications program and program recording medium which effectively achieve connection and switching (handoff or handover) of a mobile terminal to each wireless communications system, wherein the mobile terminal is capable of connecting to any of a plurality of different wireless communications systems.

BACKGROUND OF THE INVENTION

Recently, technology of connection to the Internet has been drastically advanced. In particular, both wireless communication services of Internet access service having a wide communications service area and low and medium communication data rate (not more than several hundreds kbps), typically cellular type mobile wireless communications system (hereinafter referred to as the "cellular system") and Internet access service having a local service area (a hot spot area having a diameter of several tens meters or an area of a diameter of several hundreds meters such as shopping mall or urban densely built-up area which is covered by overlapping hot spot areas) and high communication data rate (several tens Mbps), typically wireless local area network (herein after referred to as "WLAN system") exhibit rapid developments.

The cellular system has features such as wide range and diversity in communication service where as WLAN system has features such as high rate data communication and low charge (fixed charge). In order to effectively use the features of both wireless communications systems, there is a need to merge two different wireless communications systems of cellular type mobile wireless communications system and wireless local area network system and to achieve switching (handoff) therebetween in a seamless manner.

Wireless communications systems which enable a mobile terminal which can be connected and communicated to such two different wireless communications systems to connect each different system and to be seamlessly switched therebetween are proposed in, for example, Japanese Laid-Open Patent Publication No. H09-130405 (pages 13 to 14), Japanese Laid-Open Patent Publication No. 2000-32032 (page 3) and Japanese Laid-Open Patent Publication No. 2002-199426 (pages 5 to 7) In the technology which is disclosed in the above-mentioned specifications, a determination whether or not switching between the wireless communications systems is possible is made based upon the signal strength and signal quality of the receiving signal of the mobile terminal or the position of the mobile terminal and then switching between two different wireless communications systems is conducted. Seamless switching is achieved in such a manner that a user does not perceive the disconnection of communication and the generation of switching between wireless communications systems on switching.

However, the technologies which are disclosed in the above-mentioned specifications do not sufficiently consider the features of each wireless communications system and do not provide communications service which is appropriate and convenient for users, depending upon the conditions of a mobile terminal (for example, the moving speed and communication data rate of the user's mobile terminal). If switching (handoff) between two different wireless communications systems is conducted based upon the signal strength and communication quality of the receiving signal, switching between a plurality of different wireless communications systems is achieved in a seamless manner for a user depending upon the conditions concerning with the signal strength and communication quality of receiving signal. However, appropriate and convenient communications service is not necessarily provided since no condition of the mobile terminal is not considered.

For example, if communication using a WLAN system which covers a local area (hot spot area) is selected when a user moves at a high speed on a highway or Shinkansen, then switching between access points (AP) of WLAN system or WLAN service areas as well as switching between the cellular system and the WLAN system may frequently occur. This may impose excessive burden upon the processing load of the system control of each wireless communications system and the communication processing load of the mobile terminal of a user. As a result, high data rate communication becomes impossible, as well as discontinuation of the communication may occur, so that communication service which is optimum and convenient for the user can not be necessarily provided in some cases.

If the mobile terminal is in the service area which is simultaneously covered by two different wireless communications systems such as WLAN system and cellular system and is connected with the cellular system which covers a wide area so that it is in communication therewith, then switching to WLAN system which is capable of communicating at high communication data rate or at lower charge in a seamless manner is not possible.

As stated in the above, since a high frequency range is used to achieve a high data rate communication in WLAN system, the communication service area is local (range of several hundreds meters at most). In case of cellular system, it is characterized by that the communication data rate is low and medium (several hundreds kbps at most), but the communication service area is wide so that it also covers the communication service area of WLAN system (some areas such as areas in building or underground areas may not be covered).

The prior art which conducts switching (handoff) between two wireless communications systems such as WLAN system and cellular system having foregoing different features depending upon the strength or quality of receiving signal without considering the each feature above may not provide a result which is desirable for the users.

The present invention was made under such circumstances. It is an object of the present invention to provide a wireless communications system, wireless communications method, wireless communications program, and program recording medium in two different communications systems such as a wireless communications system 1 having a wide service area and a low and medium communication data rate, typically cellular system and a wireless communications system 2 having a local service area and a high communication data rate, typically WLAN system, wherein the wireless communications system, wireless communications method, wireless communications program, and program recording medium enable a mobile terminal to select a wireless communications system which is optimum for a user by considering the user's request and mobile terminal conditions such as moving speed or communication data rate of user's mobile terminal, and to connecting the mobile terminal to selected wireless communications system or to continue the communication by conducting switching (handoff) between wireless communications system when the mobile terminal is communicating with another wireless communications system.

DISCLOSURE OF THE INVENTION

A first technical means resides in a wireless communications system comprising two different wireless communications systems which are a wireless communications system 1 for medium and low data rate communication having a wide communication service area and a wireless communications system 2 for high data rate communication having a local communication service area and mobile terminals which are connectable to any of said wireless communications systems 1 and 2, wherein said mobile terminals comprise; means for determining whether or not said mobile terminal is in the respective wirelessly communicative areas of said wireless communications systems 1 and 2; means for detecting the moving speed of said mobile terminal; and/or means for detecting the communication data rate of said mobile terminal; and means for switching the connection of the mobile terminal with said wireless communications systems 1 or 2 based upon a result of determining whether or not in service areas and a result of detection of said moving speed detecting means and/or said communication data rate detecting means.

A second technical means resides in a wireless communications system as defined in the first technical means, wherein said moving speed detecting means detects the moving speed at which said mobile terminal moves by calculating the Doppler frequency which is caused by the movement of said mobile terminal.

A third technical means resides in a wireless communications system as defined in the first or second technical means, wherein said communication data rate detecting means detects the communication data rate of said mobile terminal by calculating the transmission rate of the data received and transmitted by said mobile terminal based upon the number of the transmitted or received data or the number of the transmitted or received packets, which is collected at each predetermined measuring interval.

A fourth technical means resides in a wireless communications system as defined in any of the first to third technical means, wherein if it is determined from a result of determination of said determining means that said mobile terminal is in the communicative service areas of both of said wireless communications systems 1 and 2, then the moving speed of said mobile terminal which is detected by said moving speed detecting means is compared with a preset threshold; if said moving speed is equal to or higher than said threshold, said mobile terminal is connected to said wireless communications system 1; on the other hand, if said moving speed is lower than said threshold, said mobile terminal is connected to said wireless communications system 2.

A fifth technical means resides in a wireless communications system as defined in any of the first to fourth technical means, wherein if it is determined from a result of determination of said determining means that said mobile terminal is in the communicative service areas of both of said wireless communications systems 1 and 2 and said mobile terminal is connected with said wireless communications system 1 so that it is in the state of communicating therewith, then the moving speed of said mobile terminal which is detected by said moving speed detecting means is compared with a preset threshold; if said moving speed is equal to or higher than said threshold, the connection between said mobile terminal and said wireless communications system 1 is maintained; on the other hand, if said moving speed is lower than said threshold, the connection is switched to said wireless communications system 2 by means of said switching means.

A sixth technical means resides in a wireless communications system as defined in any of the first to fourth technical means, wherein if it is determined from a result of determination of said determining means that said mobile terminal is in the communicative service areas of both of said wireless communications systems 1 and 2 and said mobile terminal is connected with said wireless communications system 2 so that it is in the state of communicating therewith, then the moving speed of said mobile terminal which is detected by said moving speed detecting means is compared with a preset threshold; if said moving speed is equal to or higher than said threshold, the connection is switched to said wireless communications system 1 by means of said switching means; on the other hand, if said moving speed is lower than said threshold, the connection with said wireless communications system 2 is maintained.

A seventh technical means resides in a wireless communications system as defined in any of the first to fourth technical means, wherein if it is determined from a result of determination of said determining means that said mobile terminal is in the communicative service areas of both of said wireless communications systems 1 and 2 and said mobile terminal is connected with said wireless communications system 1 so that it is in the state of communicating therewith, then the communication data rate of said mobile terminal which is detected by said communication data rate detecting means is compared with a preset threshold; if said communication data rate is equal to or higher than said threshold, the connection is switched to said wireless communications system 2 by means of said switching means; on the other hand, if said communication data rate is lower than said threshold, the connection with said wireless communications system 1 is maintained.

An eighth technical means resides in a wireless communications system as defined in any of the first to fourth technical means, wherein if it is determined from a result of determination of said determining means that said mobile terminal is in the communicative service areas of both of said wireless communications systems 1 and 2 and said mobile terminal is connected with said wireless communications system 2 so that it is in the state of communicating therewith, then the communication data rate of said mobile terminal which is detected by said communication data rate detecting means is compared with a preset threshold; if said communication data rate is equal to or higher than said threshold, the connection between said mobile terminal and said wireless communications system 2 is maintained; on the other hand, if said communication data rate is lower than said threshold, the connection is switched to said wireless communications system 1 by means of said switching means.

A ninth technical means resides in a wireless communications system as defined in the seventh or eighth technical means, wherein switching operation to said wireless communications system 2 is conducted if moving speed of said mobile terminal which is detected by said moving speed detecting means is lower than a preset threshold; switching operation to said wireless communications system 1 is conducted if said moving speed is equal to or higher than said threshold.

A tenth technical means resides in a wireless communications system as defined in any of the first to ninth technical means, wherein if it is determined from a result of said determination of said determining means and a result of comparison between said moving speed which is detected by said moving speed detecting means and/or said communication data rate which is detected by said communication data rate detecting means and respective preset threshold that said mobile terminal is to be connected to said wireless communications system 1 or 2, or that connection of said mobile terminal with said wireless communications system 1 or 2 is to be switched, said determined result is preliminarily informed to a user together with said determination result and said detection result prior to connection or switching, so that said mobile terminal is connected to said wireless communications system 1 or 2 which is selected by the user.

An eleventh technical means resides in a wireless communications method which is conducted in a wireless communications system comprising two different wireless communications systems which are a wireless communications system 1 for medium and low data rate communication having a wide communication service areas and a wireless communications system 2 for high data rate communication having a local communication service area and mobile terminals which are connectable to any of said wireless communications systems 1 and 2, wherein said mobile terminals switch the connection of the mobile terminal with said wireless communications systems 1 or 2 based upon a result of determination whether said mobile terminal is in respective wirelessly communicative areas of said wireless communications system 1 and 2 and results of detection of the moving speed and/or communication data rate of said mobile terminal.

A twelfth technical means resides in a wireless communications method as defined in the eleventh technical means, wherein if it is determined that said mobile terminal is in the communicative service areas of both of said wireless communications systems 1 and 2, then the moving speed of said mobile terminal is compared with a preset threshold; if said moving speed is equal to or higher than said threshold, said mobile terminal is connected to said wireless communications system 1; on the other hand, if said moving speed is lower than said threshold, said mobile terminal is connected to said wireless communications system 2.

A thirteenth technical means resides in a wireless communications method as defined in the eleventh or twelfth technical means, wherein if it is determined that said mobile terminal is in the communicative service areas of both of said wireless communications systems 1 and 2 and said mobile terminal is connected with said wireless communications system 1 so that it is in the state of communicating therewith, then the moving speed of said mobile terminal is compared with a preset threshold; if said moving speed is equal to or higher than said threshold, the connection between said mobile terminal and said wireless communications system 1 is maintained; on the other hand, if said moving speed is lower than said threshold, then connection is switched to said wireless communications system 2.

A fourteenth technical means resides in a wireless communications method as defined in the eleventh or twelfth technical means, wherein if it is determined that said mobile terminal is in the communicative service areas of both of said wireless communications systems 1 and 2 and said mobile terminal is connected with said wireless communications system 2 so that it is in the state of communicating therewith, then the moving speed of said mobile terminal is compared with a preset threshold; if said moving speed is equal to or higher than said threshold, then the connection is switched to said wireless communications system 1; on the other hand, if said moving speed is lower than said threshold, the connection with said wireless communications system 2 is maintained.

A fifteenth technical means resides in a wireless communications method as defined in the eleventh or twelfth technical means, wherein if it is determined that said mobile terminal is in the communicative service areas of both of said wireless communications systems 1 and 2 and said mobile terminal is connected with said wireless communications system 1 so that it is in the state of communicating therewith, then the communication data rate of said mobile terminal is compared with a preset threshold; if said communication data rate is equal to or higher than said threshold, the connection is switched to said wireless communications system 2; on the other hand, if communication data rate is lower than said threshold, then connection with said wireless communications system 1 is maintained.

A sixteenth technical means resides in a wireless communications method as defined in the eleventh or twelfth technical means, wherein if it is determined that said mobile terminal is in the communicative service areas of both of said wireless communications systems 1 and 2 and said mobile terminal is connected with said wireless communications system 2 so that it is in the state of communicating therewith, then the communication data rate of said mobile terminal is compared with a preset threshold; if said communication data rate is equal to or higher than said threshold, the connection between said mobile terminal and said wireless communications system 2 is maintained; if said communication data rate is lower than said threshold, the connection is switched to said wireless communications system 1.

A seventeenth technical means resides in a wireless communications method as defined in the fifteenth or sixteenth technical means, wherein switching operation to said wireless communications system 2 is conducted if said moving speed of said mobile terminal is lower than a preset threshold; switching operation to said wireless communications system 1 is conducted if said moving speed is equal to or higher than said threshold.

An eighteenth technical means resides in a wireless communications method as defined in any of the eleventh to seventeenth technical means, wherein if it is determined from a result of determination of whether the mobile terminal is in the respective service area of said wireless communications systems 1 and 2 and a result of comparison between said moving speed and/or said communication data rate and respective preset threshold that said mobile terminal is to be connected to said wireless communications system 1 or 2, or that connection of said mobile terminal with said wireless communications system 1 or 2 is to be switched, said determined result is preliminarily informed to a user together with said determination result and said detection result prior to connection or switching, so that said mobile terminal is connected to said wireless communications system 1 or 2 which is selected by the user.

A nineteenth technical means resides in a wireless communications program, wherein said program executes a wireless communications method as defined in any of the eleventh to eighteenth technical means by using computer.

A twentieth technical means resides in a program recording medium, wherein said medium records thereon the wireless communications program as defined in the nineteenth technical means in such a manner that said program can be read by computer.

In accordance with the first or eleventh technical means, the mobile terminal can immediately conduct wireless communication using any of the wireless communications systems even if the mobile terminal moves anywhere and the mobile terminal can select and communicate with a wireless communications system which provides satisfactory communication service to users.

In accordance with the second and third technical means, the moving speed and/or communication data rate of the mobile terminal can be always detected by means of the moving speed detecting means and/or communication data rate detecting means of the mobile terminal and switching between the wireless communications systems 1 and 2 can be conducted depending upon the user's situation by considering the moving speed and/or communication data rate of the mobile terminal.

In accordance with the fourth and twelfth technical means, an optimum wireless communications system can be selected based upon the moving speed of the mobile terminal if there is a request of connection for wireless communications from a user when the mobile terminal of the user exists in a service area which is simultaneously covered by the wireless communications systems 1 and 2. In other words, since the mobile terminal can be connected to the wide area wireless communications system 1 to prevent the local wireless communications system 2 from being selected if the mobile terminal moves at a high speed, frequent switching can be prevented from occurring and stable communication service and communication data rate can be provided. If the mobile terminal moves at a low speed, it can be preferentially connected and it is possible to the wireless communications system 2 to obtain high communication data rate and low charge communication service.

In accordance with the fifth or thirteenth technical means, an optimum wireless communications system can be selected based upon the moving speed of the mobile terminal even if the mobile terminal is communicating with the wireless communications system 1 when the mobile terminal of a user exists in the service area which is simultaneously covered by the wireless communications systems 1 and 2. In other words, if the mobile terminal moves at a high speed, communication with the wireless communications system 1 is maintained, so that switching to local wireless communications system 2 can be avoided. Hence, frequent switching is prevented from occurring and stable communication service and communication data rate can be provided. On the other hand, if the mobile terminal moves at a low speed, the system 1 can be preferentially switched to the wireless communications system 2. It is thus possible to obtain high communication data rate and low charge communication service.

In accordance with sixth or fourteenth technical means, an optimum wireless communications system can be selected based upon the moving speed of the mobile terminal even if the mobile terminal is communicating with the wireless communications system 2 when the mobile terminal of a user exists in the service area which is simultaneously covered by the wireless communications systems 1 and 2. In other words, if the mobile terminal moves at a high speed, switching to the wireless communications system 1 can be preferentially conducted. Therefore frequent switching of wireless communications system 2 can be avoided, and stable communication service and communication data rate can be provided. If the mobile terminal moves at a low speed, communication with the wireless communications system 2 which is capable of high data rate communication is maintained and switching to the wireless communications system 1 for low and medium data rate can be avoided. Thus, stable and high communication data rate can be assured.

In accordance with seventh or fifteenth technical means, an optimum wireless communications system can be selected based upon the communication data rate of the mobile terminal even if the mobile terminal is communicating with the wireless communications system 1 when the mobile terminal of a user exists in the service area which is simultaneously covered by the wireless communications systems 1 and 2. In other words, if the mobile terminal communicates at a high speed, switching to the wireless communications system 2 can be preferentially conducted. Hence, it is possible to obtain high communication data rate and low charge communication service. On the other hand, if the mobile terminal communicates at a low speed, communication with the system 1 is maintained and switching to the local wireless communications system 2 can be avoided. Thus, it is possible to prevent frequent switching from occurring, and to provide stable communication service and communication data rate even when the mobile terminal moves at a high speed.

In accordance with eighth or sixteenth technical means, an optimum wireless communications system can be selected based upon the communication speed of the mobile terminal even if the mobile terminal is communicating with the wireless communications system 2 when the mobile terminal of a user exists in the service area which is simultaneously covered by the wireless communications systems 1 and 2. In other words, if the mobile terminal communicates at a high speed, communication with the wireless communications system 2 is maintained, so that switching to the wireless communications system 1 for low and medium data rate can be avoided. Hence, high communication data rate and low charge communication service can be continuously provided. On the other hand, if the mobile terminal communicates at a low speed, switching to the wireless communications system 1 can be conducted to provide for high speed movement of the mobile terminal. Thus, it is possible to provide stable communication service and communication data rate.

In accordance with the ninth or seventeenth technical means, switching to optimum wireless communications system can be conducted based upon both of the communication data rate and moving speed even when the mobile terminal is communicating with the wireless communications system 1 or 2. In other words, even if a condition of switching from the wireless communications system 1 to 2 occurs due to the fact that the communication data rate is high, communication with the wireless communications system 1 is maintained without switching, and switching to the local wireless communications system 2 can be avoided if the mobile terminal moves at a high speed. Thus, it is possible to prevent frequent switching from occurring and to provide stable communications service and communication data rate. On the other hand, even if a condition to switch from the wireless communications system 2 to 1 occurs due to the fact that the communication data rate is low, switching to the wireless communications system 1, the charge of which is generally high, can be avoided. Thus, it is possible to maintain communication with the wireless communications system 2 and to obtain low charge communication service.

In accordance with the tenth or eighteenth technical means, selection condition of the wireless communications system can be preliminarily presented to a user depending upon the moving speed and/or communication data rate of the mobile terminal prior to connection to the wireless communications system 1 or 2, or prior to switching to the wireless communications system 1 or 2. Thus, connection to the wireless communications system which is desired by the user can be conducted in accordance with the user's decision.

In accordance with the nineteenth technical means, it is possible to control connection or switching for the wireless communications system 1 or 2, so that it is possible to conduct connection or switching control in a flexible manner. Moreover, in accordance with the twentieth technical means, flexible connection or switching control can be easily achieved by obtaining commercially available program recording medium.

PREFERRED EMBODIMENT OF THE INVENTION

An embodiments of a wireless communications system, a wireless communications method, a wireless communications program and a program recording medium of the present invention will now be described with reference to the drawings.

Figure 1:
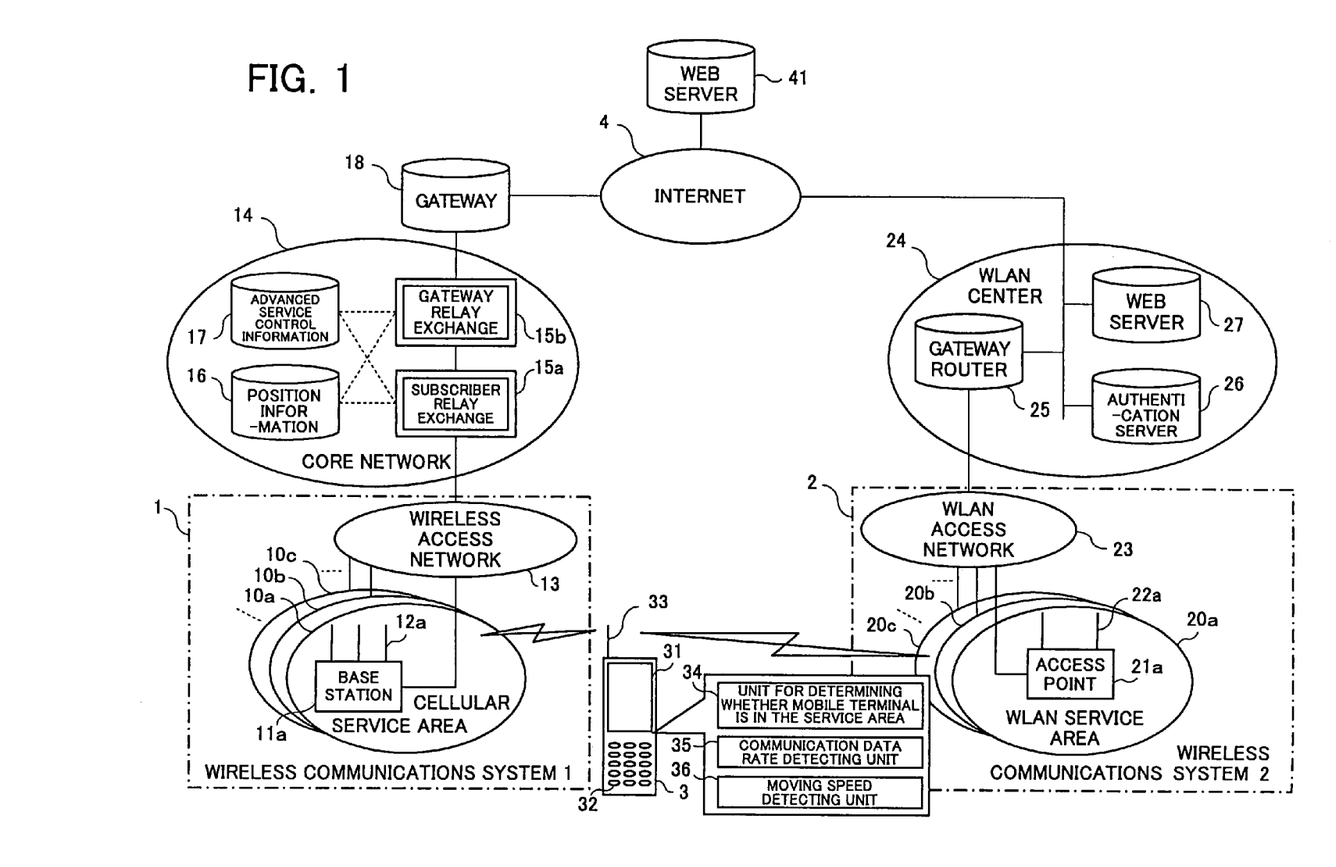
FIG. 1 is a network configuration view showing an example of a network configuration of a wireless communications system of the present invention.

FIG. 1 shows a network configuration view showing an example of a network configuration of the wireless communications system of the present invention. A general view of the configuration of a network comprising a plurality of (two in the present embodiment) different wireless communications systems is illustrated. In other words, it shows an example that the wireless communications system comprises; two different wireless communications systems as a plurality of different wireless communications systems which are a wireless communications system 1 using a cellular type wireless communications system (cellular system) which provides a communications service having a wide service area and a medium and low communication data rate and a wireless local area network system (WLAN system) which provides a communications service having a local service area and a high communication data rate; and dual mode mobile terminals 3 which can be connected with both the wireless communications systems 1 and 2 for wireless communications. The mobile terminals 3 can be also connected with the Internet 4 via any of the wireless communications systems 1 and 2 in this example.

In other words, the wireless communications system 1 comprises a cellular type mobile wireless communications system (cellular system) based on, for example, W-CDMA (wideband Code Division Multiple Access) scheme. The wireless communications system 1 covers a wide communications service area and achieves a maximum data transfer rate of 384 kbps outdoors and charges the service based upon the communications period of time or communication data amount. The system is capable of providing a service for users who move at high speed such as users on automobiles or the Shinkansen. However, in accordance with the present invention, the wireless communications system 1 is not limited to only W-CDMA scheme, but may be other digital cellular type wide area wireless communications systems such as GSM (Global System for Mobile Communications).

The wireless communications system 2 comprises a wireless local area network system (WLAN system) of, for example, IEEE 802.11b or 802.11a or IEEE 802.11g standards (IEEE: Institute of Electrical and Electronics Engineers). The wireless communications system 2 covers a local service area (communications service areas are discrete and narrow) and achieves a maximum high data transfer rate of 54 Mbps. The system 2 usually adopts low or fixed economical charging system and provides the services for users who move at low speed such as users who are stationary or walking. However, in accordance with the present invention, the wireless communications system 2 is not limited to only wireless local area network system (WLAN system) of IEEE 802.11b or 802.11a or IEEE 802.11g standard, but may be other high data rate wireless local area network such as UWB (Ultra Wideband) of next generation wireless local area network which exceeds 100 Mbps or IEEE 802.11b, IEEE 802.11i, IEEE 802.11j.

Base stations 11a, 11b, 11c, . . . corresponding to respective communications service area of cellular service areas 10a, 10b, 10c, . . . which indicate a plurality of communications service areas (cells) in cellular system are provided in the wireless communications system 1 as shown in FIG. 1 The antennas 12a, 12b, 12c, . . . of the base station receive and transmit radio wave signals from and to an antenna 33 of the mobile terminal 3, respectively. Each of the base stations 11a, 11b, 11c, . . . is connected with a core network (CN) 14 through a radio access network (RAN) 13. The core network 14 comprises a subscriber relay exchange 15a which connects to subscriber lines from the radio access network 13, a gate relay exchange 15b which connects to relay lines from each of the subscriber relay exchange 15a to enable connection with a gateway 18, a position information data base 16 which registers information on the position of each mobile terminal 3 and advanced service control information data base 17 which registers information to control advanced communications service which is provided by the core network 14. The gateway relay exchange 15b of the core network 14 is connected to the Internet 4 through the gateway 18.

On the other hand, access points (APs) 21a, 21b, 21c, . . . corresponding to respective communication service area of WLAN service areas 20a, 20b, 20c, . . . which indicate a wireless communication regions (cells) are provided in the wireless communications system 2 as shown in FIG. 1. The antennas 22a, 22b, 22c of the access points receive and transmit radio signals from or to the antenna 33 of the mobile terminal 3. Each of the access points (APs) 21a, 21b, 21c, . . . is connected to a WLAN (wireless local area network) center 24 via a WLAN (wireless local area network) access network 23. The WLAN center 24 comprises a gateway router 25 which performs a gateway function for connected WLAN access network 23, an authentication server 26 which performs authentication of each mobile terminal 3 and a WEB server 27 which provides various information services. The gateway router 25 of WLAN center 24 is connected to the Internet 4.

The mobile terminal 3 may be connected to any one of the wireless communications systems 1 and 2 by a radio signal from the antenna 33 by using a display unit 31 including a liquid crystal display and the like and an input unit 32 including actuation keys and the like, so that it is possible through the connected wireless communications system 1 or 2 to accesses the WEB server 41 which is connected to the Internet 4. A unit 34 which determines whether or not the mobile terminal 3 is in the service area of the wireless communications system 1 or 2, a moving speed detecting unit 36 which detects the moving speed of the mobile terminal 3 and/or a communication data rate detecting unit 35 which detects the communication data rate of the mobile terminal 3 are incorporated in the mobile terminal 3 as will be described in detail.

Figure 2:
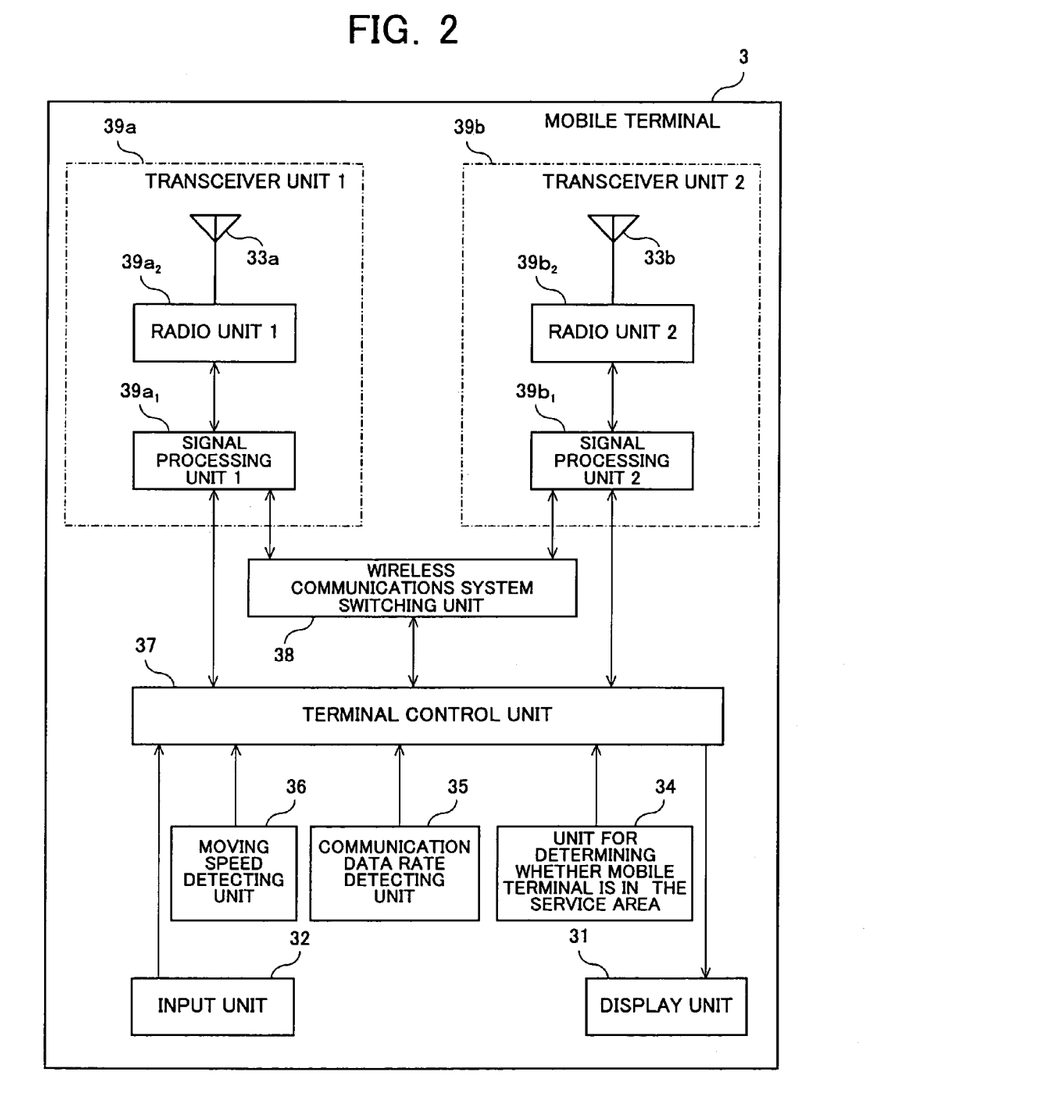
FIG. 2 is a block configuration view showing an example of a block configuration which constitutes the inner structure of a mobile terminal which is shown in FIG. 1.

Now, an example of a block configuration which constitutes the inner structure of the mobile terminal 3 which is shown in FIG. 1 will be described with reference to a block diagram of FIG. 2.

The mobile terminal 3 is formed with a dual mode transceiver which is capable of communicating with any of two wireless communications i.e. the wireless communications systems 1 and 2. The antenna 1 33a, radio unit 1 $39a_2$ and signal processing unit 1 $39a_1$ constitute a transceiver unit 1 39a which corresponds to the wireless communications system 1. The antenna 2 33b, radio unit 2 $39b_2$ and signal processing unit 2 $39b_1$ constitute a transceiver unit 2 39b which corresponds to the wireless communications system 2. The antennas 1 33a and 2 33b may be formed of a single dual frequency antenna. Switching between the transceiver units 1 39a and 2 39b is conducted under control from a wireless communications system switching unit 38.

Other units such as a terminal control unit 37, input unit 32 and display unit 31 are common units of the mobile terminal 3 comprising a dual mode transceiver. The terminal control unit 37 is adapted to perform the key input control of an input unit 32, screen display control of a display unit 31 and a battery control. It also performs the control of the whole mobile terminal 3 including the control of transceiver units 1 39a and 2 39b. Various programs such as user interface software, and application software are executed by a terminal control unit 37 having a main CPU.

Moreover, the terminal control unit 37 collects parameters which represent respective communication quality of the signals which are received by the transceiver units 1 39a and 2 39b, such as BER (Bit Error Rate), BLER (Block Error Rate), SNR (Signal To Noise Ratio) and also RSSI (Receiving Signal Strength Indicator), and collects information on whether or not the mobile terminal 3 is in the service area, which is determined by the determining unit 34 based upon the collected communication quality and signal strength and further collects information on moving speed of the mobile terminal 3 from the moving speed detecting unit 36 and information on communication data rate from the communication data rate detecting unit 35.

The terminal control unit 37 comprehensively may consider collected information on communication quality, signal strength, information on whether the terminal is in the service area, moving speed and/or communication data rate, display on the display unit 31 a result of determination for selecting a proper wireless communications system, detect a result of selection which is entered by a user from the input unit 32, and select a wireless communications system which is desired by a user by controlling the wireless communications system switching unit 38 to switch between the transceiver units 39a and 39b. Alternatively, the terminal control unit 37 may select a proper wireless communications system by controlling the wireless communications system switching unit 38 to automatically switch between transceiver units 39a and 39b based upon the result from the comprehensive consideration of the collected information on whether the terminal is in the service area, information on terminal moving speed and/or communication speed.

The moving speed detecting unit 36 is adapted to estimate the moving speed at which the mobile terminal 3 moves. In order to estimate the moving speed of the mobile terminal 3, various approaches are applicable. One approach involves calculating the Doppler frequency caused by the movement of the mobile terminal 3 by detecting the variations of the level of the envelope of receiving power due to Rayleigh Fading to count the number of times when the level of the envelope intersects the reference receiving power level in an upward direction, so that the moving speed of the mobile terminal 3, which is averaged at regular intervals is calculated. Another approach involves estimating the Doppler frequency based upon the pilot symbol in case of W-CMDA.

The communication data rate detecting unit 35 can determine the communication data rate of the mobile terminal 3 by collecting the number of transmitted or received data (for example, the number of transmitted or received bytes) or the number of transmitted or received packets at regular intervals, to calculate the data transfer rate at which the mobile 3 transmits or receives the data. Thus the communication data rate of the mobile terminal 3 can be calculated.

Figure 3:
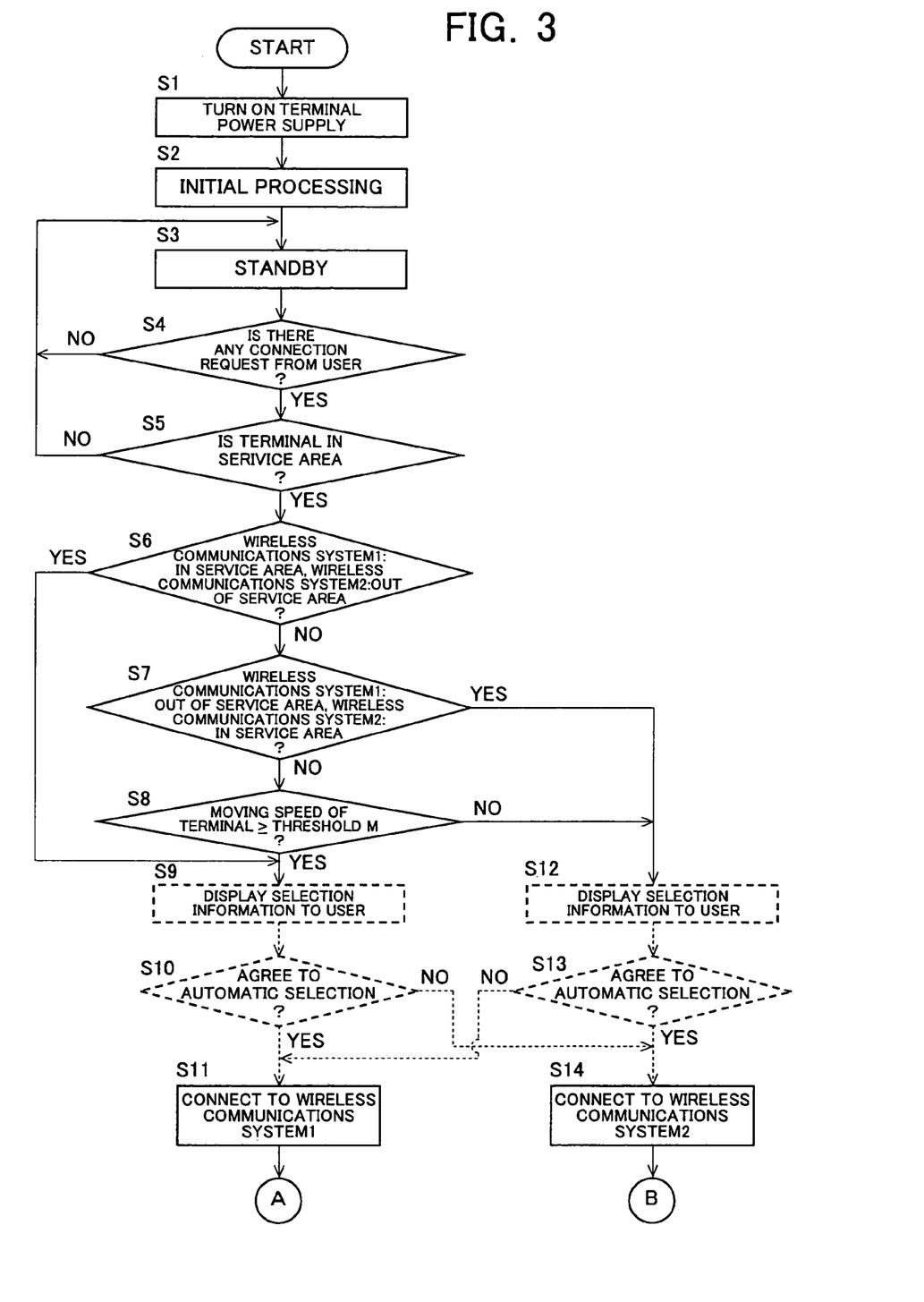
FIG. 3 is a processing flow chart explaining a process in which a wireless communications system is selected when power supply of the mobile terminal is turned on to initiate communication.

Now, a process in which the mobile terminal 3 selects an appropriate wireless communications system will be described with reference to processing flow charts of FIGS. 3 through 5. Firstly, a process for selecting a wireless communications system when power supply of the mobile terminal 3 is turned on to initiate communication will be described with reference to a flow chart shown in FIG. 3.

When power to the mobile terminal 3 is turned on (step S1), search for base station is conducted for the wireless communications system 1, so that a base station having highest signal strength of pilot channel signal, for example, a base station 11a is selected for connection, so that a report information from the base station 11a is received and initial processing such as attach processing is conducted (step S2). Subsequently, the mobile terminal 3 is brought into a standby mode at which periodical detection of signal reception and periodical position registration processing is conducted on a paging channel (step S3).

On the other hand, an initial processing is conducted in which an access point (AP) is searched for the wireless communications system 2, so that an access point having strongest periodical beacon signal, such as access point 21a, is selected for connection (step S2). Subsequently, the mobile terminal 3 is brought into a standby mode in which the periodical beacon signal is received for establishing synchronization (step S3).

If a request for connection of communication is issued by a user actuating the input unit 32, for example, there is a request of access to the WEB server 41 of the Internet 4 (YES at step S4), a determination is made whether or not the mobile terminal 3 is in the serviceable areas of both the wireless communications systems 1 and 2. Such determination may be made by, for example, the unit for determining whether mobile terminal is in the service area 34, based upon a result of measurement of the signal strength of the signal which is received by the antennas 33a and 33b (step S5). If mobile terminal 3 is determined as not being in any service areas of both the wireless communications systems 1 and 2 (NO at step S5), the mobile terminal 3 is returned to standby mode at step S3 since it cannot meet the connection request from the user.

On the other hand, if a determination is made that the mobile terminal is in any of service areas of the wireless communications systems 1 and 2 (YES at step S5), a further determination whether the terminal is in the service area is made at next steps S6 and S7.

If a determination that the mobile terminal 3 is in the service area of the wireless communications system 1 and is out of the service area of the wireless communications system 2 is made (YES at step S6), it means that only the wide area cellular mobile wireless communications system (cellular system) of the wireless communications system 1 can be used, so that connection with the wireless communications system 1 is conducted (step S11). If a determination that the mobile terminal 3 is out of the service area of the wireless communications system 1 and is in the service area of the wireless communications system 2 (YES at step S7), only narrow wireless local area network system (WLAN system) of the wireless communications system 2 can be used, so that connection with the wireless communications system is conducted (step S14).

If there are two wireless communications systems i.e. wireless communications systems 1 and 2 at the same time, in other words, if the mobile terminal is in the service areas of both two wireless communications systems (No at steps S6 and S7), the program will proceed to step S8.

The moving speed of the mobile terminal 3 which is averaged at regular intervals and is output from the moving speed detecting unit 36 is compared with a threshold M which is predetermined as a reference. If the moving speed of the mobile terminal 3 is equal to or higher than the threshold M, for example, it is not lower than the threshold 50 km/h (YES at step S8), then it is determined that use of the wireless communications system 2 for local communications which causes frequent switching to the access points other than access point (AP) 21a while it enables high data rate communication and low charges (it may be fixed) does not provide any merits to users, so that connection with the wireless communications system 1 is automatically conducted (step S11).

On the contrary, if the moving speed of the mobile terminal 3 is lower than the threshold M, for example, lower than lower than 50 km/h (NO at step S8), then it is determined that use of the wireless communications system 2 for local communication which enables high data rate communication with low charges provides merits for users, so that connection with the wireless communications system is automatically conducted (step S14).

Prior to automatic connection with the wireless communications systems 1 and 2 at steps S11 and S14, respectively, an situation whether the mobile terminal 3 is in the service area, the moving speed of the mobile terminal 3, a result of selection between the wireless communications system 1 and 2 may be displayed on the display unit 31 (step S9 or S12) to enable a user to select the connection with desired wireless communications system as mentioned above (as shown by a dotted line in FIG. 3). In other words, if a user enters an instruction to permit the connection with the wireless communications system in accordance with the result of automatic selection from the input unit 32 based upon a display on the display unit 31 (YES at step S10 or S13), connection with automatically selected wireless communications system is conducted (step S11 or S14). If the user enters an instruction which is different from the result of automatic selection regarding the connection to the wireless communications system (NO at step S10 or S13), connection with the wireless communications system which is different from the automatically selected wireless communications system may be conducted (step S14 or S11)

Now, a process for selecting a wireless communications system which involves a switching (handoff) operation when the mobile terminal 3 is in a communicating state will be described with reference to processing flow charts of FIGS. 4 and 5. FIGS. 4 and 5 show that the mobile terminal 3 is in the communicating state using the wireless communicating systems 1 and 2, respectively.

Figure 4:
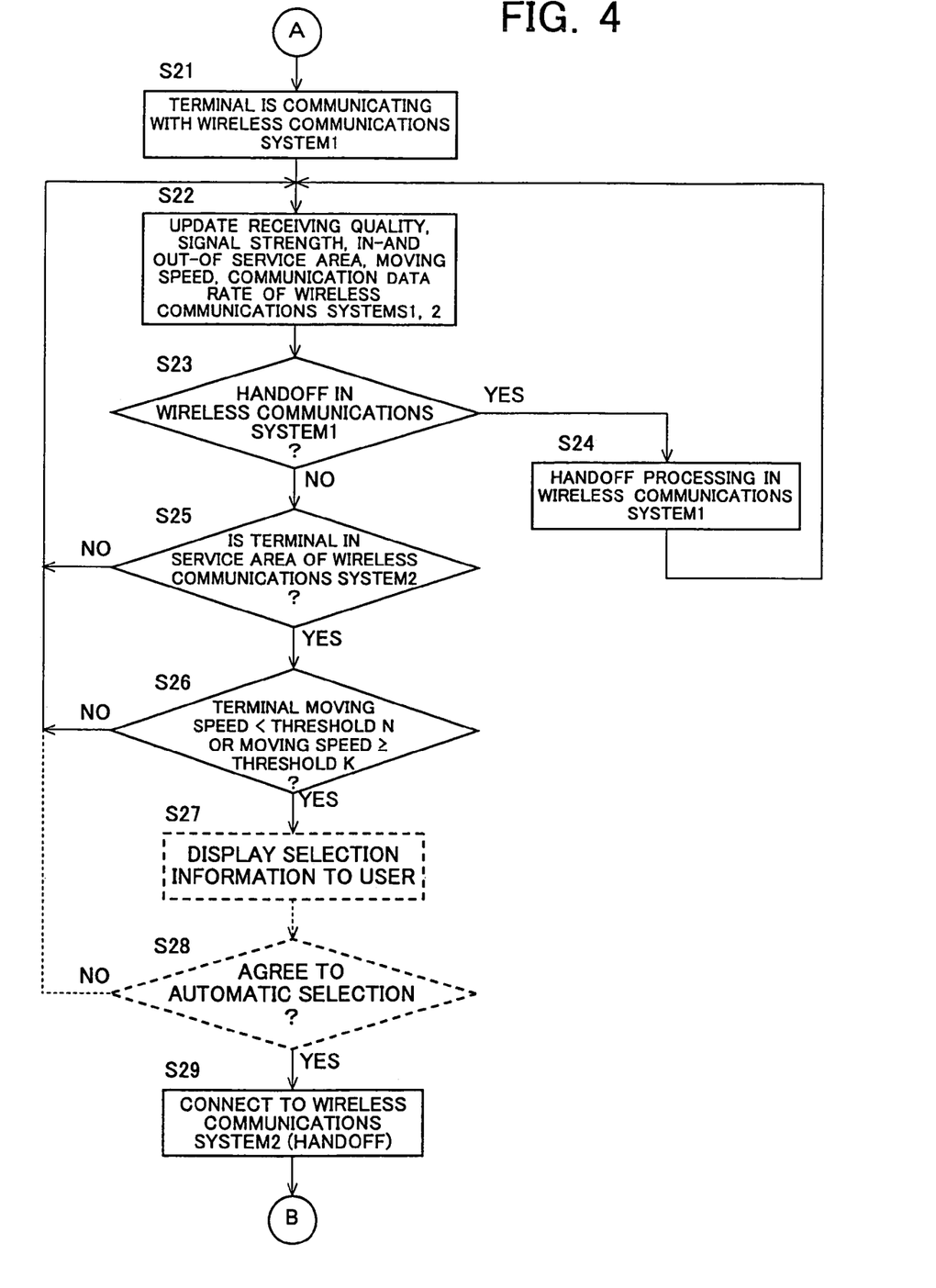
FIG. 4 is a processing flow chart explaining a process in which a wireless communications system is selected involving switching when the mobile terminal is communicating with the wireless communications system 1.
Figure 5:
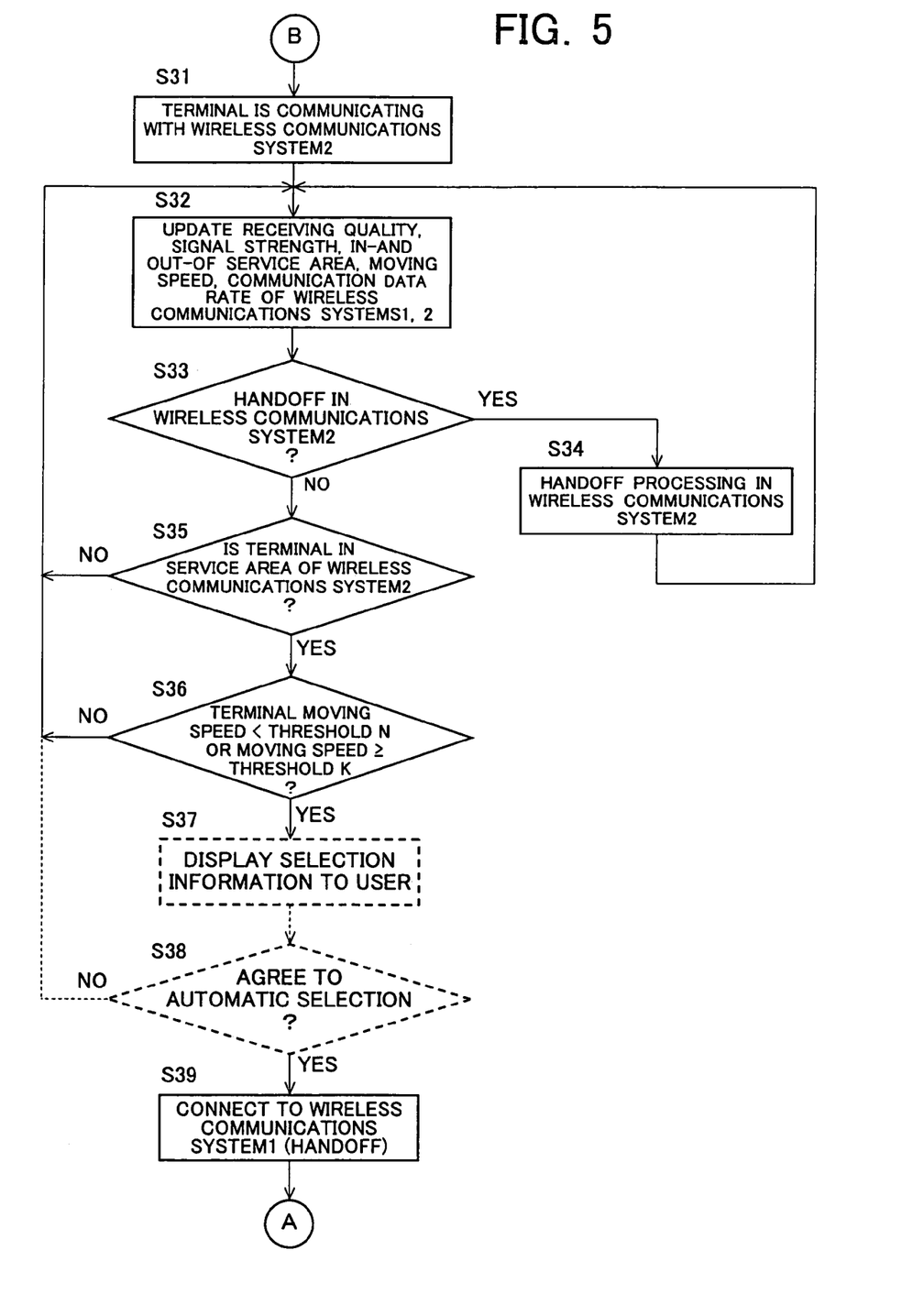
FIG. 5 is a processing flow chart explaining a process in which a wireless communications system is selected involving switching when the mobile terminal is communicating with the wireless communications system 2.

If the mobile terminal 3 is in the communicating state using the wireless communications system 1 as shown in FIG. 4 (step S21), information on the result of respective determinations whether the mobile terminal 3 is in the service areas of wireless communications systems 1 and 2, communication quality and field strength of the receiving signals of the wireless communications systems 1 and 2, the moving speed and communication data rate of the mobile terminal 3 is updated (step S22). Thereafter, a determination whether a switching (handoff) of cellular service areas (cells) in the same wireless communications system i.e. the wireless communications system 1 is necessary or not is made by detecting operation of peripheral base stations in cellular service areas (step S23).

If it is determined that a switching is necessary (YES at step S23), switching between the cellular service areas of the wireless communications system 1 is conducted by switching the cells in the transceiver unit 1 39a (step S24) and program sequence will return to processing at step S22. If there is no necessity to switch between the cellular service areas of the wireless communications system 1 (NO at step S23), a determination whether the mobile terminal 3 is also in the service area of the wireless communications system 2 (step S25) is made. If the mobile terminal 3 is not in the service area of the wireless communications system 2 (NO at step S25), then the program will proceed to processing at step S22 to continue the communication using the wireless communications system 1.

On the contrary, if the mobile terminal 3 is also in the service area of the wireless communications system 2 (YES at step S25), the moving speed of the mobile terminal 3 is detected by the moving speed detecting unit 36. If the moving speed is lower than a predetermined threshold N, for example, lower than 50 km/h which is equal to said threshold M (YES at step S26), it is determined that use of the local area wireless communications system 2 which enables high data rate communication with low charges provides merits to user and switching (handoff) from the wireless communications systems 1 to 2 is automatically conducted (step S29). Alternatively, if the mobile terminal is also in the service area of the wireless communications system 2 (YES at step S25), the communication data rate of the mobile terminal 3 is detected by the communication data rate detecting unit 35. If the communication data rate is not lower than a predetermined threshold K, for example, not lower than 250 kbps (YES at step S26), it is determined that use of the local area wireless communications system 2 which enables high data rate and low charge communication provides merits to users, so that switching (handoff) from the wireless communications systems 1 to 2 is automatically conducted (step S29).

If the mobile terminal is switched from the wireless communications systems 1 to 2 based upon the communication data rate which is detected by the communication data rate detecting unit 35, switching may be conducted only if the moving speed which is detected by using the moving speed detecting unit 36 is lower than a predetermined threshold N. In other words, it prepares for the possibility that even if connection is switched to the wireless communications system 2 in which high data rate communication is possible when the moving speed is not lower than said threshold N, then frequent switching of WLAN service areas may occur, which may not only make it impossible to conduct desired high data rate communication but also result in the interruption of the communication.

The condition whether the mobile terminal 3 is in the service area, the moving speed and/or communication data rate of the mobile terminal 3 selection result of switching (handoff) to the wireless communications system 2 are displayed on the display unit 31 (step S27) enable the user to select connection to desired wireless communications system prior to automatic process of switching (handoff) to the wireless communications system 2 at step S29 as mentioned above (as shown by a dotted line in FIG. 4). In other words, if the user enters from the input unit 32 an instruction to switch the connection to the wireless communications system 2 according to the result of automatic selection based upon the result of a display on the display unit 31 (YES at step S28), switching to the wireless communications system 2 which is automatically selected is conducted (step S29). On the other hand, if the user enters an instruction to continue the connection with the wireless communications system 1, which is different from the result of automatic selection from the input unit 32 (NO at step S28), the program sequence may proceed to step S22 at which connection to the wireless communications system 1 is continued.

Now, operation when the mobile terminal 3 is in the state of communicating using the wireless communications system 2, which is substantially similar to the above-mentioned operation which is applied when the mobile terminal 3 is in the state of communicating using the wireless communications system 1 shown in FIG. 4 will be described with reference to FIG. 5. If the mobile terminal 3 is in the communicating state using the wireless communicating system 2 shown in FIG. 5 (step S31) information on the result of respective determination whether the mobile terminal 3 is in the service areas of wireless communications system 1 and 2, communication quality and field strength of the receiving signals of the wireless communications systems 1 and 2, the moving speed and communication data rate of the mobile terminal 3 is updated (step S32). Thereafter, a determination whether a switching (handoff) of WLAN service areas (cells) in the same wireless communications system, that is the wireless communications system 2 is necessary or not is made by detecting operation of peripheral access points (APs) in WLAN service areas (step S33).

If it is determined that a switching is necessary (YES at step S33), switching between the WLAN service areas of the wireless communications system 2 is conducted by switching the cells in the transceiver unit 2 39b (step S34) and program sequence will return to processing at step S32. On the other hand, if there is no necessity to switch between the cellular service areas of the wireless communications system 2 (NO at step S33), a determination whether the mobile terminal 3 is also in the service area of the wireless communications system 1 (step S35) is made. If the mobile terminal 3 is not in the service area of the wireless communications system 1 (NO at step S35), then the program will proceed to processing at step S32 to continue the communication using the wireless communications system 2.

On the contrary, if the mobile terminal 3 is also in the service area of the wireless communications system 1 (YES at step S35), the moving speed of the mobile terminal 3 is detected by the moving speed detecting unit 36. If the moving speed is equal to or higher than a predetermined threshold N, for example, equal to or higher than 50 km/h which is equal to said threshold M (YES at step S36), it is determined that use of the wide area wireless communications system 1 which can be used even if the terminal moves at a high speed provides merits to users and switching (handoff) from the wireless communications systems 2 to 1 is automatically conducted (step S39). Alternatively, if the mobile terminal 3 is also in the service area of the wireless communications system 1 (YES step S35), the communication data rate of the mobile terminal 3 is detected by the communication data rate detecting unit 35. If the communication data rate is lower than a predetermined threshold K, for example, lower than 250 kbps (YES at step S36), it is determined that use of wide area wireless communications system 1 which enables medium and low data rate communication provides merits to users, so that switching (handoff) from the wireless communications systems 2 to 1 may be automatically conducted (step S39).

If the mobile terminal is switched from the wireless communications systems 2 to 1 based upon the communication data rate which is detected by the communication data rate detecting unit 35, switching may be conducted only if the moving speed which is detected by using the moving speed detecting unit 36 is equal to or higher than a predetermined threshold N. In other words, it prepares for the possibility that even if connection is switched to the wireless communications system 1 which is suitable for medium and low communication data rate when the moving speed is lower than said threshold N, then there is threat that the communication charge will become higher than that of the wireless communications system 2, so that more economical wireless communications system 2 is continuously used.

The condition whether the mobile terminal 3 is in the service area, the moving speed and/or communication data rate of the mobile terminal 3 and selection result of switching to the wireless communications system 1 are displayed on the display unit 31 (step S37) enable the user to select connection to desired wireless communications system prior to automatic process of switching to the wireless communications system 2 at step S39 as mentioned above (as shown by a dotted line in FIG. 5). In other words, if the user enters from the input unit 32 an instruction to switch the connection to the wireless communications system 1 according to the result of automatic selection based upon the result of a display on the display unit 31 (YES at step S38), switching to the wireless communications system 1 which is automatically selected is conducted (step S39). On the other hand, if the user enters an instruction to continue the connection with the wireless communications system 2, which is different from the result of automatic selection result from the input unit 32 (NO at step S38), the program sequence may proceed to step S32 at which connection to the wireless communications system 2 is continued.

Foregoing wireless communications system, wireless communications method, wireless communications program, and program recording medium of the present invention provide advantages as follows: Wireless communication can be conducted by automatically selecting an optimum wireless communications system for users depending upon the moving speed and communication data rate of a mobile terminal in the mobile terminal which is capable of dual radio communicating using any of a plurality of different wireless communications systems.

If a request for connection of wireless communication is made from a user when a user's mobile terminal exists in a service area which is simultaneously covered by a plurality of different wireless communications systems, a wireless communications system having local service areas is not selected when mobile terminal moves at a high speed, but a wireless communications system having wide service areas is selected for connection, therefore it is possible to prevent frequent switching (handoff) from occurring and to provide stable communication service. When the mobile terminal moves at a low speed, a wireless communications system which is capable of high data rate communication is preferentially selected for connection even if its service areas are local, thus, it is possible to obtain high data rate communication service.

If a user's mobile terminal is in a service area which is simultaneously covered by a plurality of different wireless communications systems and is in the communicating state and moves at a high speed, then the mobile terminal is connected with a wireless communications system having wide service areas to continue the communication and it is possible to obtain a stable communication service and communication data rate. On the other hand, if the moving speed is low, the mobile terminal is connected with a wireless communications system which is capable of high data rate communication and continues the communication, therefore, it is possible to obtain high data rate communication service.

If a user's mobile terminal is in a service area which is simultaneously covered by a plurality of different wireless communications systems and is in the communication and communicates at low data rate, then the mobile terminal is connected with a wireless communications system adapted for medium or low data rate communication and conducts the communication, therefore it is possible to secure stable communication service and communication data rate. On the other hand, if the communication data rate is high, the mobile terminal is connected to a wireless communications system in which high data rate communication is possible to obtain high data rate communication service.

Even if a condition for switching from a wireless communications system for medium and low data rate communication to that for high data rate communication occurs based upon both the communication data rate and moving speed due to the fact that the current communication data rate is high, connection with the wide area wireless communications system for medium and low data rate communication which can cope with high speed movement is maintained without switching to obtain continuous and stable communication service. Even if a condition for switching from a wireless communications system for high data rate communication to that for medium and low data rate communication occurs due to the fact that the communication data rate is low, switching to the wireless communications system for medium and low data rate communication is avoided if the mobile terminal moves at a low speed when the communication charge of the system for medium and low data rate communication is higher. Thus, connection with the local area wireless communications system which is capable of high data rate communication is maintained therefore it is possible to continuously obtain low charge communication service.

Selection condition of the wireless communications system can be preliminarily presented to a user depending upon the moving speed and/or communication data rate of the mobile terminal prior to connection to the wireless communications system, or prior to switching to the wireless communications system. Thus, connection to the wireless communications system which is desired by the user can be conducted in accordance with the user's determination.

The invention claimed is:

1. A wireless communications system comprising:
two different wireless communications systems which are a first wireless communications system for medium and low data rate communication having a wide communication service area and a wireless communications system for high data rate communication having a local communication service area and mobile terminals which are connectable to any of said first and second wireless communications systems, wherein
said mobile terminals comprising:
a determining unit determining whether or not said mobile terminal is in the respective wirelessly communicative areas of said first and second wireless communications systems based upon determining signal strength of a received signal;
a moving speed detecting unit detecting the moving speed of said mobile terminal; and
a communication data rate detecting unit detecting the communication data rate of said mobile terminal; and
a switching unit switching the connection of the mobile terminal with said first or second wireless communications systems based upon a comprehensive consideration of a result of determining whether or not in service areas and a result of detection of said moving speed detecting unit and said communication data rate detecting unit, wherein
if it is determined from a result of said determination of said determining unit and a result of comparison between said moving speed which is detected by said moving speed detecting unit and said communication data rate which is detected by said communication data rate detecting unit and respective preset threshold that said mobile terminal is to be connected to said first or second wireless communications system, or that connection of said mobile terminal with said first or second wireless communications system is to be switched, said determined result is informed to a user together with said determination result and said detection result, so that said mobile terminal is connected to said first or second wireless communications system which is selected by the user.

2. A wireless communications system as defined in claim 1, wherein if it is determined from a result of determination of said determining unit that said mobile terminal is in the communicative service areas of both of said first and second wireless communications systems, then the moving speed of said mobile terminal which is detected by said moving speed detecting unit is compared with a preset threshold; if said moving speed is equal to or higher than said threshold, then said mobile terminal is connected to said first wireless communications system; and, if said moving speed is lower than said threshold, said mobile terminal is connected to said second wireless communications system.

3. A wireless communications system as defined in any of claims 1 or 2, wherein if it is determined from a result of determination of said determining unit that said mobile terminal is in the communicative service areas of both of said first and second wireless communications systems and said mobile terminal is connected with said first wireless communications system so that it is in the state of communicating therewith, then the moving speed of said mobile terminal which is detected by said moving speed detecting unit is compared with a preset threshold; if said moving speed is equal to or higher than said threshold, the connection between said mobile terminal and said first wireless communications system is maintained; and, if said moving speed is lower than said threshold, connection is switched to said second wireless communications system by said switching unit.

4. A wireless communications system as defined in any of claims 1 or 2, wherein if it is determined from a result of determination of said determining unit that said mobile terminal is in the communicative service areas of both of said first and second wireless communications systems and said mobile terminal is connected with said second wireless communications system so that it is in the state of communicating therewith, then the moving speed of said mobile terminal which is detected by said moving speed detecting unit is compared with a preset threshold; if said moving speed is equal to or higher than said threshold, the connection is switched to said first wireless communications system by said switching unit; and, if said moving speed is lower than said threshold, connection with said wireless communications system is maintained.

5. A wireless communications system as defined in any of claims 1 or 2, wherein if it is determined from a result of determination of said determining unit that said mobile terminal is in the service areas of both of said first and second wireless communications systems and said mobile terminal is connected with said first wireless communications system so that it is in the state of communicating therewith, then the communication data rate of said mobile terminal which is detected by said communication data rate detecting unit is compared with a preset threshold; if communication data rate is equal to or higher than said threshold, the connection is switched to said second wireless communications system by said switching unit; if said communication data rate is lower than said threshold, the connection with said first wireless communications system is maintained.

6. A wireless communications system as defined in claim 5, wherein said switching operation to said second wireless communications system is conducted if said moving speed of said mobile terminal which is detected by said moving speed detecting unit is lower than a preset threshold; switching operation to said first wireless communications system is conducted if said moving speed is equal to or higher than said threshold.

7. A wireless communications system as defined in any of claims 1 or 2, wherein if it is determined from a result of determination of said determining unit that said mobile terminal is in the communicative service areas of both of said first and second wireless communications systems and said mobile terminal is connected with said second wireless communications system so that it is in the state of communicating therewith, then the communication data rate of said mobile terminal which is detected by said communication data rate detecting is compared with a preset threshold; if said communication data rate is equal to or higher than said threshold, the connection between said mobile terminal and said second wireless communications system is maintained; and, if said communication data rate is lower than said threshold, the connection is switched to said first wireless communications system by means of said switching unit.

8. A wireless communications system as defined claim 1, wherein said determined result is preliminarily informed to the user together with said determination result and said detection result prior to connection or switching, so that said mobile terminal is connected to said first or second wireless communications system which is selected by the user.

9. A wireless communications system as defined in claim 1, wherein if it is determined from a result of said determination of said determining unit and a result of comparison between said moving speed which is detected by said moving speed detecting unit and said communication data rate which is detected by said communication data rate detecting unit and respective preset threshold that said mobile terminal is to be connected to said first or second wireless communications system, or that connection of said mobile terminal with said first or second wireless communications system is to be switched, said determined result is informed to a user together with said determination result and said detection result, so that said mobile terminal is connected to said first or second wireless communications system which is selected by the user.

10. A wireless communications method which is conducted in a wireless communications system comprising two different wireless communications systems which are a first wireless communications system for medium and low data rate communication having a wide communication service areas and a second wireless communications system for high data rate communication having a local communication service area and mobile terminals which are connectable to any of said first and second wireless communications systems, the method comprising:

determining whether or not said mobile terminal is in the respective wirelessly communicative areas of said first and second wireless communications systems based upon determining signal strength of a received signal;

detecting the moving speed of said mobile terminal; and detecting the communication data rate of said mobile terminal; and switching the connection of the mobile terminal with said first or second wireless communications systems based upon a comprehensive consideration of a result of determination whether said mobile terminal is in respective wirelessly communicative areas of said first and second wireless communications system and results of detection of the moving speed and communication data rate of said mobile terminal, wherein if it is determined from a result of determination whether said mobile terminal is in the respective service areas of said first and second wireless communications system and a result of comparison between said moving speed and said communication data rate and respective preset threshold that said mobile terminal is to be connected to said first or second wireless communications systems, or that connection of said mobile terminal with said first or second wireless communications system is to be switched, said determined result is informed to a user together with said determination result and said detection result, so that said mobile terminal is connected to said first or second wireless communications system which is selected by the user.

11. A wireless communications method as defined in claim 10, wherein if it is determined that said mobile terminal is in the communicative service areas of both of said first and second wireless communications systems, then the moving speed of said mobile terminal is compared with a preset threshold; if said moving speed is equal to or higher than said threshold, said mobile terminal is connected to said wireless communications system 1; and, if said moving speed is lower than said threshold, said mobile terminal is connected to said second wireless communications system.

12. A wireless communications method as defined in claim 10, wherein if it is determined that said mobile terminal is in the communicative service areas of both of said first and second wireless communications systems and said mobile terminal is connected with said first wireless communications system so that it is in the state of communicating therewith, then the moving speed of said mobile terminal is compared with a preset threshold; if said moving speed is equal to or higher than said threshold, the connection between said mobile terminal and said first wireless communications system is maintained; and, if said moving speed is lower than said threshold, the connection is switched to said second wireless communications system.

13. A wireless communications method as defined in claim 10, wherein if it is determined that said mobile terminal is in the communicative service areas of both of said first and second wireless communications systems and said mobile terminal is connected with said second wireless communications system so that it is in the state of communicating therewith, then the moving speed of said mobile terminal is compared with a preset threshold; if said moving speed is equal to or higher than said threshold, the connection is switched to said first wireless communications system; and, if said moving speed is lower than said threshold, the connection with said second wireless communications system is maintained.

14. A wireless communications method as defined in claim 10, wherein if it is determined that said mobile terminal is in the communicative service areas of both of said first and second wireless communications systems and said mobile terminal is connected with said first wireless communications system so that it is in the state of communicating therewith, then the communication data rate of said mobile terminal is compared with a preset threshold; if said communication data rate is equal to or higher than said threshold, the connection is switched to said second wireless communications system; and, if said communication data rate is lower than said threshold, the connection with said first wireless communications system is maintained.

15. A wireless communications method as defined in claims 10, wherein if it is determined that said mobile terminal is in the communicative service areas of both of said first and second wireless communications systems and said mobile terminal is connected with said second wireless communications system so that it is in the state of communicating therewith, then the communication data rate of said mobile terminal is compared with a preset threshold; if said communication data rate is equal to or higher than said threshold, the connection between said mobile terminal and said second wireless communications system is maintained; and, if said communication data rate is lower than said threshold, the connection is switched to said first wireless communications system.

16. A wireless communications method as defined in claim 14 or 15, wherein switching operation to said second wireless communications system is conducted if moving speed of said mobile terminal is lower than a preset threshold; switching operation to said first wireless communications system is conducted if said moving speed is equal to or higher than said threshold.

17. A wireless communications method as defined in claim 10, wherein said determined result is preliminarily informed to the user together with said determination result and said detection result prior to connection or switching, so that said mobile terminal is connected to said first or second wireless communications system which is selected by the user.

18. A computer readable recording medium having wireless communication program recorded thereon, when executed by a computer to perform the method of claim 10.

19. A wireless communications system as defined in claim 10, wherein if it is determined from a result of determination whether said mobile terminal is in the respective service areas of said first and second wireless communications system and a result of comparison between said moving speed and said communication data rate and respective preset threshold that said mobile terminal is to be connected to said first or second wireless communications systems, or that connection of said mobile terminal with said first or second wireless communications system is to be switched, said determined result is informed to a user together with said determination result and said detection result, so that said mobile terminal is connected to said first or second wireless communications system which is selected by the user.

* * * * *